July 15, 1958
J. T. KELLY
2,843,642
ALKYLATION PROCESS
Filed Sept. 14, 1956
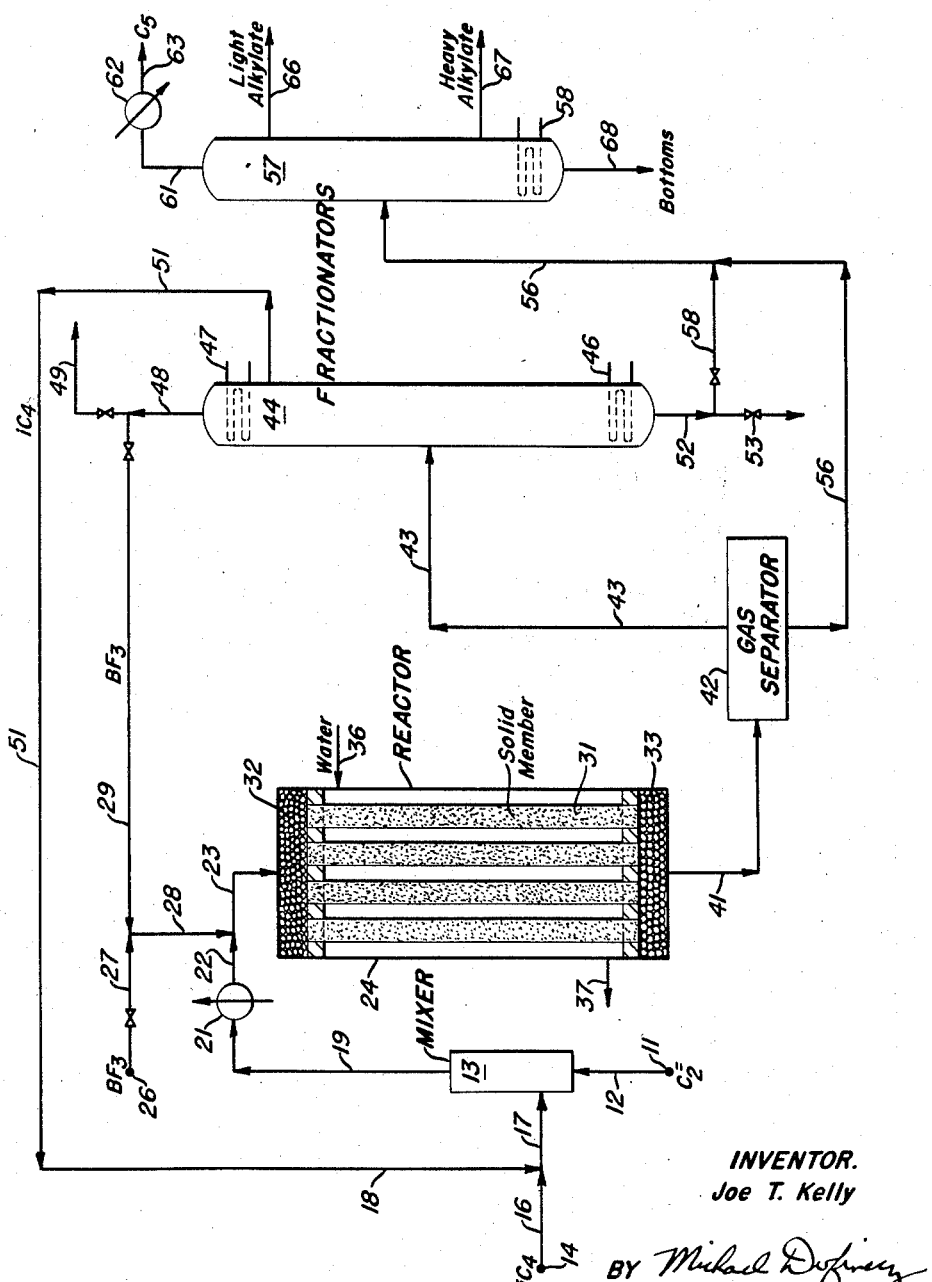
INVENTOR.
Joe T. Kelly
BY Michael Dofney
ATTORNEY United States Patent Office 2,843,642
Patented July 15, 1958

2,843,642

ALKYLATION PROCESS

Joe T. Kelly, Dickinson, Tex., assignor to The American Oil Company, Texas City, Tex., a corporation of Texas Application September 14, 1956, Serial No. 609,904

10 Claims. (Cl. 260—683.44)

This invention relates to the reaction of isoparaffins and olefins. More particularly it relates to the alkylation of isobutane with ethylene.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. Other objects will become apparent in the course of the detailed description.

The alkylation of isoparaffins with olefins is carried out in the presence of a novel catalyst pair. One member of the catalyst pair is boron trifluoride. The other member of the catalyst pair is a cationic exchange resin. Although the second component of the catalyst pair is spoken of as a cationic exchange resin, it is believed that the solid member is more properly a complex of the defined resin and $BF_3$.

Boron trifluoride is one member of the catalyst pair. Commercial grade anhydrous boron trifluoride is suitable for use as this member of the catalyst pair.

The other member of the catalyst pair, hereinafter spoken of as the solid member, is a cationic exchange resin, i. e., an ion exchange resin having acid characteristics. The resin may be used as a fine powder, pellets, beads, spheres, etc. Examples of suitable resins are the sulfonic acid type with a polystyrene nuclei, such as sold by Rohm & Haas as Amberlite IR-120; sulfonic acid type with an expanded phenolic matrix, such as sold by Chemical Process Co. as Duolite C-10; carboxylic acid type on a cross-linked acrylic resin matrix such as sold by Chemical Process Co. as Duolite CS-101. Other ion exchange resins having acid properties may be used.

$BF_3$ and the defined resin react to form a solid material containing $BF_3$ probably as a complex, which designation is used hereafter herein. When the resin and $BF_3$ are contacted in a closed vessel, the $BF_3$ partial pressure drops very rapidly at first and then gradually approaches a constant value.

A "complex" of the defined resins and $BF_3$ is not an effective catalyst for the alkylation in the absence of free-$BF_3$. Free-$BF_3$ is to be understood as $BF_3$ existing in the reaction zone which is not bound up with a defined resin. As soon as the resin has complexed with some $BF_3$, the beneficial catalytic effect exists. Thus free-$Bf_3$ may exist in the reaction zone, as evidenced by the formation of alkylate, even though the resin is not saturated with bound $BF_3$. In a batch system, wherein less $BF_3$ is present than is theoretically required to saturate the resin, eventually no alkylation will occur as charge is added, since all of the $BF_3$ will become bound.

In general, the process is carried out utilizing an amount of $BF_3$ which is in excess of that required to saturate the resin present in the contacting zone; the saturation amount being dependent on the type of resin charged. More than the minimum amount of free-$BF_3$ is beneficial, in fact, the yield of alkylate increases rapidly with increase in free-$BF_3$ present, up to a maximum amount. The amount of free-$BF_3$ used is dependent somewhat upon the reactants themselves. The free-$BF_3$ usage is desirably, set out on a $BF_3$ to olefin weight ratio, of at least about 0.2. In other words, at least about 0.2 lb. of free-$BF_3$ per lb. of olefin charged to the alkylation zone is desirable. About 1.5 parts by weight of $BF_3$ per part of olefin charged appears to be about the desirable maximum usage of $BF_3$. It is preferred to use between about 0.35 and 1 part by weight of free-$BF_3$ per part by weight of olefin when utilizing the lower molecular weight olefin, such as ethylene and propylene.

The process may be carried out at any temperature below the temperature at which the "complex" or resin alone decomposes. The temperature of operation may be as low as —20° C. or even lower. Temperatures as high as 150° C. and even higher may be used with some of the resins. More usually the temperature of operation will be between about 0° C. and 50° C. Lower temperatures appear to favor the formation of the hydrocarbons having 6 to 7 carbon atoms. It is preferred to operate at a temperature between about 0° C. and 25° C.

Sufficient pressure is maintained on the system to keep a substantial portion of the hydrocarbons charged in the liquid state. The process may be carried out at relatively low pressures, for example, 100 p. s. i., or it may be carried out at elevated pressures, for example, 2000 p. s. i., or more. In general, pressures will be between about 200 and 1000 p. s. i. and preferably between about 300 and 600 p. s. i.

The contacting of the isoparaffin and the olefin in the presence of the defined catalyst pair is continued until an appreciable amount of alkylate has been formed. In batch reactions, it is possible to convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is prefered to operate with ethylene or propylene.

The isoparaffin reactant is defined as a paraffinic hydrocarbon which has a tertiary hydrogen atom, i. e. paraffins which have a hydrogen atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more olefins may be charged. In general, when a particular product distribution is desired, it is preferable to operate with a single isoparaffin and a single olefin, for example, isobutane and ethylene, both of about 95% purity.

The reactants may be mixed together before they are charged into the reactor. Or, they may be charged into the reactor separately. Or, a portion of the olefin may be blended with the isoparaffin before introduction into the reactor and the remainder of the olefin injected into the reactor. The charge may be introduced all at one point into the reactor or it may be introduced at 2 or more points. The alkylation reaction is exothermic and temperature control is facilitated by introducing the olefin into the reactor at more than one point.

The $BF_3$ member of the catalyst pair may be premixed with the isoparaffin and olefin before introducing these into the reactor but this should not be done when an extremely reactive system such as isobutanes and isobutylene are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing for a batch-type reaction, i. e., one wherein the desired amount of isoparaffin and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reactor may be a fixed bed type wherein the reactants and free-$BF_3$ are flowed through a bed of the resin member of the catalyst pair, the space velocity being controlled so that the desired amount of reaction is obtained during the passage of the reactants through the bed of resin. Under some conditions, a moving bed of resin may be utilized. In still another set of circumstances, a fluidized bed of resin may be utilized with the incoming stream of reactants providing the energy for the fluidization of the resin. Other methods of operation common in the catalytic refining aspects of the petroleum industry utilizing solid catalyst may be readily devised.

It has been pointed out that the solid member of the catalyst pair is thought to be a complex of the defined resin and $BF_3$. The complex may be preformed, by exposing the resin to $BF_3$ for a time sufficient to introduce some $BF_3$ into the solid component or even enough to saturate the resin, i. e., when the resin will take up no more $BF_3$ at a given temperature and pressure, this being done before the reactants are introduced into the reaction zone or even before the solid member of the catalyst pair is positioned in the reaction zone. The complex may be formed in situ during a batch-type reaction. In the batch-type operation, it is convenient to introduce all the $BF_3$ into the reaction vessel at once. This amount of $BF_3$ is sufficient not only to saturate the resin but also provide the desired amount of free-$BF_3$. In a flow system, the solid member may be prepared in situ by charging fresh resin to the reaction zone and forming the complex during the initial passage of reactants and $BF_3$ over the resin. Some alkylation reaction occurs even though the resin has not taken up sufficient $BF_3$ to saturate it. As the flow of reactants and $BF_3$ continues over the solid member, eventually the resin will become saturated with respect to $BF_3$. At this time, the amount of $BF_3$ introduced into the reaction zone should be cut back to that amount of free-$BF_3$ desired, under this particular set of operating conditions.

The illustrative embodiment set out in the annexed figure forms a part of this specification. It is pointed out that this embodiment is schematic in nature, that many items of process equipment have been omitted, since these may be readily added by those skilled in this art and that this embodiment is only one of many which may be devised, and that the invention is not to be limited to this particular embodiment.

In the figure, it is desired to produce a high yield of di-isopropyl for use as a blending material for gasoline. Ethylene from source 11 is passed by way of line 12 into mixer 13. Liquid isobutane from source 14 is passed by way of lines 16 and 17 into mixer 13. Both the ethylene and the isobutane are about 90% purity, the remainder being n-butane and ethane, with trace amounts of other components found in materials derived from petroleum refining sources. Mixer 13, in this instance, is a simple orifice-type mixer suitable for intermingling a liquid and a gas, or two liquids. Recycle isobutane from line 18 is passed by way of line 17 into mixer 13. In this embodiment, the molar ratio of isobutane to ethylene is 6.

From mixer 13, the blend of isobutane and ethylene is passed by way of line 19, through heat exchanger 21, where the temperature of the blend is adjusted to 10° C. The temperature of the blend leaving exchanger 21 is somewhat lower than the reaction temperature, since there is a heat rise in the reactor due to exothermic reaction. From exchanger 21, the stream of isobutane and ethylene is passed by way of lines 22 and 23 into the top of reactor 24.

Boron trifluoride is passed from source 26 by way of valved line 27 and line 28 into line 23, where it meets the stream of isobutane and ethylene. If desirable, a mixer may be introduced into line 23 to insure complete intermingling of the $BF_3$ and the hydrocarbon charged. Recycle $BF_3$ is introduced from line 29 by way of lines 28 and 23. In this embodiment, the resin is completely complexed with respect to $BF_3$ and only the necessary free-$BF_3$ is introduced by way of line 28. The weight ratio of free-$BF_3$ from line 28 to ethylene present in line 23 is 1.1.

Reactor 24 is shown as a shell and tube type vessel. Resin-$BF_3$ complex is contained in the tubes 31. The alumina balls 32 and 33 are positioned above and below the headers in the reactor to maintain the solid member within the tubes. In order to maintain the temperature in the reactor at substantially 10° C., water is introduced into the shell side by way of line 36 and is withdrawn by way of line 37.

In this embodiment, the reactor was charged with Amberlite 120. The resin was preformed into round pellets about one-eighth inch in diameter. The resin was contacted with $BF_3$ in an amount such that it was saturated with $BF_3$. This operation was carried out before reactants were introduced into the reactor. The reactor pressure was maintained at 600 p. s. i. This permits maintaining the isobutane and substantially all of the ethylene in the liquid state.

The product hydrocarbon mixture is passed out of reactor 24 by way of line 41. This stream contains the alkylate product, unreacted isobutane, a small amount of unreacted ethylene and pentanes as well as $BF_3$. The stream from line 41 is passed into gas separator 42 where the $BF_3$, isobutane, some pentanes and some alkylate product are taken overhead by way of line 43. The material taken overhead from the separator 42 is passed into fractionator 44.

Fractionator 44 is adapted to separate the $BF_3$ as a gas, the isobutane as a liquid and the higher boiling materials as a bottoms product. Fractionator 44 is provided with an internal reboiler 46 and an internal condenser 47. $BF_3$ and unreacted ethylene are taken overhead from fractionator 44 by way of line 48 and may be passed out of the system by way of valved line 49. The material from line 49 may be periodically passed to a $BF_3$ purification operation to remove non-condensable inert gases which build up in the system. Ordinarily the stream from line 48 is recycled by way of valved lines 29 and lines 28 and 23 to reactor 24.

Isobutane is withdrawn as a liquid stream by way of line 51 and is recycled by way of lines 18 and 17 to mixer 13 for reuse in the process. Bottoms product from fractionator 44 is withdrawn by way of line 52 and may be passed to storage or further processing by way of valved line 53. This stream from line 52 consists substantially of isopentane. Some unsaturated $C_5$ hydrocarbons are also present and also a small amount of higher boiling alkylate material.

The liquids separated in gas separator 42 are passed by way of line 56 into fractionator 57. The bottoms product from fractionator 44 may be passed by way of valved line 58 and line 56 into fractionator 57 for complete removal of the alkylate material. In this embodiment, the bottoms are passed to fractionator 57.

Fractionator 57 is provided with an internal reboiler 58 and is adapted to produce the desired alkylate products from the hydrocarbon product mixture entering from line 56. A vapor stream is taken overhead by way of line 61, is condensed in cooler 62 and is passed to storage by way of line 63. The material from line 63 consists substantially of isopentane and some unsaturated $C_5$ material. This material may be used as a high octane blending stock for the production of motor gasoline of the desired volatility characteristics.

The alkylate product herein is considered to be that boiling above the pentane range and boiling below the maximum temperature usable in motor gasoline. In general, a 415° F. endpoint alkylate is blendable into motor gasoline without adverse effect in a specification calling for a 400° F. gasoline endpoint. Thus the alkylate product is considered to be the material boiling between about the lower limit of the hexane range and 400° F. in the ASTM distillation procedure.

Light alkylate, which includes all the $C_6$ material and some of the $C_7$ material, is withdrawn from fractionator 57 by way of line 66. Heavy alkylate, which includes most of the $C_7$ and material boiling up to 415° F. is withdrawn from fractionator 57 by way of line 67. A small amount of higher boiling bottoms is withdrawn by way of line 68.

In general, the $C_6$ fraction of the alkylate product will contain from about 85 to about 93 mole percent of diisopropyl (2,3-dimethylbutane). 2-methylpentane and 3-methylpentane represent substantially the remainder of the $C_6$ product. Generally, only trace amounts of n-hexane are present.

The results obtainable by the process of the instant invention are set out in illustrative runs, the results of which appear in the table.

These runs were carried out under what are more or less standard conditions, namely, a 4-liter carbon steel bomb was dried overnight in a stream of hot air at 110° C. The fresh resin to be tested (90 grams) was charged to the bomb as in granular or bead form and the bomb was evacuated. One kilogram of a dry blend of ethylene and isobutane was added and then $BF_3$ (90 grams) was pressured in. The charged bombs were placed in a rocker and allowed to rock for 20 hours. At the end of this time, a liquid sample was drawn through a bomb containing activated alumina (to remove dissolved $BF_3$ and solid particles). This sample was submitted for Podbielniak distillation. A $C_6$ cut from the Podbielniak distillation was analyzed by mass spectrometer. In some cases after sampling, the remaining major portion of the product was debutanized on an Oldershaw column and then fractionated on a packed column.

The resins were washed with dilute aqueous HCl and distilled water. The washed resins were dried in a forced-draft oven overnight at about 100° C. The dried resins were used as the charge to the bomb.

Tests showed that in the absence of free-$BF_3$, the resin-$BF_3$ "complex" was completely ineffective to catalyze ethylene-isobutane reaction. $BF_3$ alone gave a yield of 34% based on ethylene charged. The data show that the dual catalyst is an effective catalyst for the difficult ethylene-isobutane reaction.

Table

| Run No. | A | | B | | C | |
|---|---|---|---|---|---|---|
| Resin | Amberlite 120 | | Duolite CS-101 | | Duolite C-10 | |
| Functional Group | Sulfonic | | Carboxyl | | Sulfonic | |
| Conditions: | | | | | | |
| Isobutane/Olefin (molar) | 3.0/1 | | 2.8/1 | | 2.8/1 | |
| Hydrocarbon/Resin (weight) | 11.2/1 | | 11.0/1 | | 11.1/1 | |
| $BF_3$/Ethylene (weight) | 0.6/1 | | 0.6/1 | | 0.6/1 | |
| Time (hours) | 20 | | 20 | | 20 | |
| Temperature (° C.) | 18–20 | | 20–25 | | 20–25 | |
| Pressure Range (p. s. i. g.) | 328–78 | | 330–210 | | 300–215 | |

| | Wt. percent | Br No. | Wt. percent | Br No. | Wt. percent | Br No. |
|---|---|---|---|---|---|---|
| Yields (wt. percent on $C_2$= charged): | | | | | | |
| $C_5$ | 15 | | 11 | | 12 | |
| $C_6$ (110°–165° F.) | 69 | 0.1 | 87 | 0.0 | 54 | 0.0 |
| $C_7$ (165°–194° F.) | 11 | 0.1 | 7 | 0.0 | 6 | 0.0 |
| $C_8$ (194°–266° F.) | 65 | 0.1 | 56 | 0.1 | 43 | 0.0 |
| $C_9+$ | 53 | | 33 | | 29 | |
| Total Alkylate (debutanized) | 213 | | 194 | | 144 | |
| Ethylene Converted | 98 | | 85 | | 69 | |
| MS Analysis of $C_6$ Cut (mole percent): | | | | | | |
| 2,3-Dimethylbutane | 88.4 | | 92.8 | | 93.2 | |
| 3-Methylpentane | 4.1 | | 3.6 | | 3.3 | |
| 2,2-Dimethylbutane | 1.8 | | 1.7 | | 2.2 | |
| 2-Methylpentane | 5.5 | | 1.8 | | 1.0 | |
| n-Hexane | 0.2 | | 0.1 | | 0.3 | |

Thus having described the invention, what is claimed is:

1. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about −20° C. and 150° C. and a pressure between about 100 and 2000 p. s. i., said pressure being at least sufficient to keep a substantial portion of said reactants in the liquid state, for a time sufficient to permit an appreciable amount of alkylation reaction to take place, in the presence of a catalyst comprising essentially (i) an acidic cationic exchange resin and (ii) boron trifluoride, said $BF_3$ being present in an amount in excess of that needed to saturate the resin, a product hydrocarbon mixture is removed from said contacting zone and an alkylate hydrocarbon product is separated from said mixture.

2. The process of claim 1 wherein said isoparaffin is isobutane.

3. The process of claim 1 wherein said isoparaffin is di-isopropyl.

4. The process of claim 1 wherein said olefin is ethylene.

5. The process of claim 1 wherein said olefin is propylene tetramer.

6. The process of claim 1 wherein the $BF_3$ is present in an amount, in excess of the saturation amount, such that the free-$BF_3$ to olefin weight ratio is between about 0.2 and 1.5.

7. An alkylation process which comprises contacting isobutane and ethylene in a molar ratio of isobutane to ethylene between about 2 and 25 at a temperature between about 0° C. and 50° C. at a pressure between about 200 and 1000 p. s. i., said pressure being sufficient to keep a substantial portion of said reactants in the liquid state for a time sufficient to permit an appreciable amount of alkylation reaction to take place, in the presence of a catalyst pair comprising essentially (a) a resin-$BF_3$ complex consisting of an acid ion exchange resin and about the amount of $BF_3$ needed to saturate said resin and (b) boron trifluoride in an amount such that the weight ratio of free-$BF_3$ to ethylene charged is at least about 0.2, removing product hydrocarbon mixture containing alkylate product from said contacting zone and separating alkylate hydrocarbon product from unreacted isobutane and ethylene.

8. The process of claim 7 wherein said temperature is between about 0° C. and 25° C.

9. The process of claim 7 wherein said free-$BF_3$/ethylene weight ratio is between about 0.35 and 1.

10. The process of claim 7 wherein said resin consists of sulfonic acid groups joined to polystyrene nuclei.

References Cited in the file of this patent
UNITED STATES PATENTS

| | | |
|---|---|---|
| 2,390,836 | Hennion et al. | Dec. 11, 1945 |
| 2,470,144 | Clarke | May 17, 1949 |
| 2,570,407 | Upham | Oct. 9, 1951 |

FOREIGN PATENTS

| | | |
|---|---|---|
| 733,753 | Great Britain | July 20, 1955 |

OTHER REFERENCES

Kressman: "History and Some Applications of Ion Exchange," Research, May 1952, pp. 212–219.